United States Patent
Bruno

(10) Patent No.: US 11,780,589 B2
(45) Date of Patent: Oct. 10, 2023

(54) ENVIRONMENTAL CONTROL SYSTEM WITH OPTIMIZED MOISTURE REMOVAL

(71) Applicant: Hamilton Sundstrand Corporation, Windsor Locks, CT (US)

(72) Inventor: Louis J. Bruno, Ellington, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/362,858

(22) Filed: Nov. 29, 2016

(65) Prior Publication Data

US 2018/0148179 A1    May 31, 2018

(51) Int. Cl.
 *B64D 13/06*  (2006.01)
 *F25B 9/00*  (2006.01)
 *F25B 47/00*  (2006.01)

(52) U.S. Cl.
CPC .............. *B64D 13/06* (2013.01); *F25B 9/004* (2013.01); *F25B 47/00* (2013.01); *B64D 2013/0618* (2013.01); *B64D 2013/0662* (2013.01); *F25B 2400/23* (2013.01); *F25B 2500/14* (2013.01)

(58) Field of Classification Search
CPC .................... B64D 13/06; B64D 13/08; B64D 2013/0662; B64D 2013/0618; B64D 2013/0688; B64D 2013/0603; B64D 2013/0611; B64D 2013/0648; F25B 9/004; F25B 2400/23; F25B 2500/14
See application file for complete search history.

(56) References Cited

U.S. PATENT DOCUMENTS

| | | | |
|---|---|---|---|
| 5,299,763 A | 4/1994 | Bescoby et al. | |
| 5,461,882 A | 10/1995 | Zywiak | |
| 6,128,909 A | 10/2000 | Jonqueres | |
| 6,295,822 B1 | 10/2001 | Mueller | |
| 6,449,963 B1 | 9/2002 | Ng et al. | |
| 9,669,936 B1 | 6/2017 | Fiterman et al. | |
| 2001/0004837 A1* | 6/2001 | Sauterleute | B64D 13/06 62/402 |
| 2008/0110193 A1 | 5/2008 | Jonqueres | |
| 2012/0285184 A1 | 11/2012 | Voinov | |
| 2015/0065025 A1* | 3/2015 | Bruno | B64D 13/08 60/785 |

(Continued)

FOREIGN PATENT DOCUMENTS

EP    3249195 A1    11/2017

OTHER PUBLICATIONS

Search Report dated Mar. 20, 2018, EP Application No. 1723797.0, 7 pages.

(Continued)

*Primary Examiner* — Tavia Sullens
(74) *Attorney, Agent, or Firm* — CANTOR COLBURN LLP

(57) ABSTRACT

An airplane is provided. The airplane includes an environmental control system coupled to an engine and an inlet. The engine provides a bleed. The inlet provides a fresh medium. The environmental control system includes a compressing device comprising a compressor and a turbine. The environmental control system also includes a moisture removal circuit that separately removes moisture from each of the first and second mediums prior to combining the first medium and the second medium to form mixed air.

2 Claims, 3 Drawing Sheets

(56) References Cited

U.S. PATENT DOCUMENTS

2016/0231031 A1    8/2016  Bruno
2017/0341759 A1*  11/2017  Bruno ................... B64D 13/02
2017/0341760 A1*  11/2017  Hall ....................... B64D 13/02

OTHER PUBLICATIONS

European Extended Search Report; European Application No. 21190301.8; dated Jan. 7, 2022; 7 pages.

* cited by examiner

ENVIRONMENTAL CONTROL SYSTEM WITH OPTIMIZED MOISTURE REMOVAL

BACKGROUND

In general, contemporary air condition systems are supplied a pressure at cruise that is approximately 30 psig to 35 psig. The trend in the aerospace industry today is towards systems with higher efficiency. One approach to improve airplane efficiency is to eliminate the bleed air entirely and use electrical power to compress outside air. A second approach is to use lower engine pressure. The third approach is to use the energy in the bleed air to compress outside air and bring a mixture into the cabin. One of the challenges of the latter approach is the removal of moisture in the mixture entering the cabin.

BRIEF DESCRIPTION

According to one or more embodiments, an airplane is provided. The airplane includes an environmental control system coupled to an engine and an inlet. The engine provides a bleed. The inlet provides a fresh medium. The environmental control system includes a compressing device comprising a compressor and a turbine. The environmental control system also includes a moisture removal circuit that separately removes moisture from each of the first and second mediums prior to combining the first medium and the second medium to form mixed air.

According to one or more embodiments, an airplane is provided. The airplane includes an environmental control system coupled to an engine. The environmental control system configured to receive a first medium from the engine and a second medium from a second source. The environmental control system is also configured to combine the first medium and the second medium to form a mixed medium at a mixing point and separately remove moisture from each of the first and second mediums prior to combining the first medium and the second medium.

Additional features and advantages are realized through the techniques of the embodiments herein. Other embodiments are described in detail herein and are considered a part of the claims. For a better understanding of the embodiments with the advantages and the features, refer to the description and to the drawings.

BRIEF DESCRIPTION OF THE DRAWINGS

The subject matter is particularly pointed out and distinctly claimed in the claims at the conclusion of the specification. The forgoing and other features, and advantages thereof are apparent from the following detailed description taken in conjunction with the accompanying drawings in which:

DETAILED DESCRIPTION

A detailed description of one or more embodiments of the disclosed apparatus and method are presented herein by way of exemplification and not limitation with reference to the FIGS.

Embodiments herein provide an environmental control system of an aircraft that mixes mediums from different sources to power the environmental control system and to provide cabin pressurization and cooling at high fuel burn efficiency. The medium can generally be air, while other examples include gases, liquids, fluidized solids, or slurries.

Figure 1:
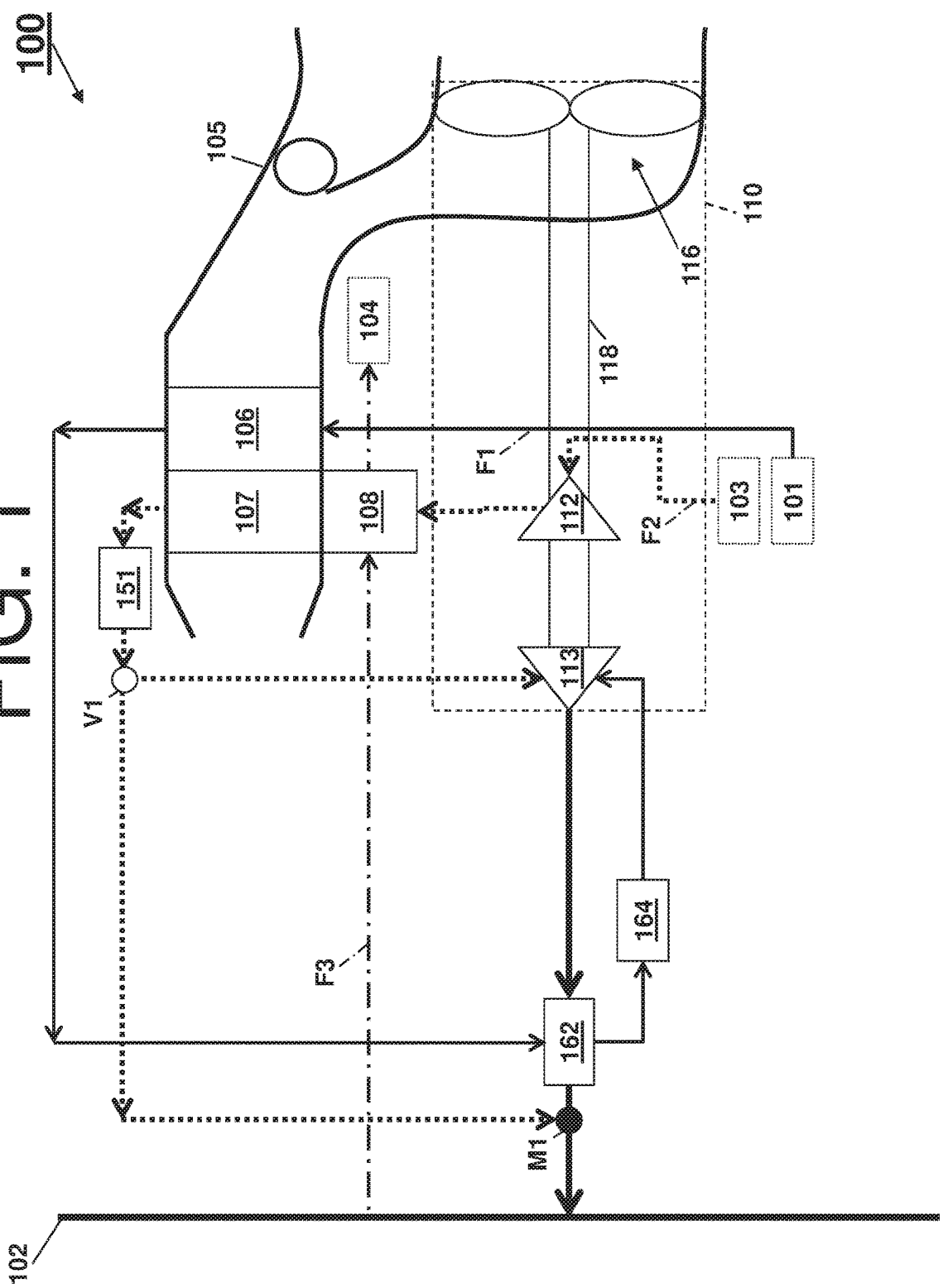
FIG. 1 is a diagram of a schematic of an environmental control system for mixing bleed air and fresh air according to an embodiment.

Turning to FIG. 1, a schematic of an environmental control system is depicted according to a non-limiting embodiment (i.e., a system 100), as it could be installed on an aircraft. The aircraft example is not intended to be limiting, as alternative embodiments are contemplated As shown in FIG. 1, the system 100 can receive a first medium F1 from an inlet 101 and provide a conditioned form of the first medium F1, as indicated by thin-solid-lined arrows, that eventually is a first portion of mixed air provided to a volume 102. In view of the above aircraft embodiment, the first medium F1 can be bleed air, which is pressurized air supplied to or originating from (being "bled' from) an engine or auxiliary power unit of the aircraft. Note that temperature, humidity, and pressure of the bleed air can vary widely depending upon a compressor stage and revolutions per minute of the engine. Generally, the bleed air described herein is high-pressure air.

The system 100 can receive a second medium F2 from an inlet 103 and provide a conditioned form of the second medium F2, as indicated by dotted-lined arrows, that eventually is a second portion of the mixed air provided to a volume 102. The second medium F2 can be fresh air, which can be outside air destined to enter the pressurized volume. The outside air can be procured by one or more scooping mechanisms, such as an impact scoop or a flush scoop. Thus, the inlet 103 can be considered a fresh air inlet or an outside out inlet. Generally, the fresh air described herein is at an ambient pressure outside of the aircraft with respect to altitude.

The system 100 can further receive a third medium F3 from the pressurized volume and provide a conditioned form of the third medium F3 to an outlet 104 (as described herein), as indicated by a dot-dashed-lined arrows. Based on modes of operation, the system 100 can mix the first medium F1 and the second medium F2 at the different points within the system 100 to produce the mixed air, as indicated by thick-solid-lined arrows.

The third medium F3 can be cabin discharge air, which can be air leaving the volume 102. For instance, the volume 102 can be pressurized air within an aircraft cabin or a combined flight deck and aircraft cabin. Generally, the pressurized air described herein is at pressure that creates a safe and comfortable environment for humans on the aircraft. This pressurized air can be utilized by the system 100 before being supplied to a destination, such as the outlet 104. Examples of the outlet 104 can include, but are not limited to, the aircraft cabin, the combined flight deck and aircraft cabin, a cabin pressure control system, a ram circuit, and an outflow valve. In a non-limiting embodiment, the cabin discharge air can be resupplied to the aircraft cabin or the combined flight deck and aircraft cabin. This resupplied cabin discharge air can be referred to as recirculation air.

The system 100 can comprise a ram circuit. The ram circuit comprises a shell 105 encasing one or more heat exchangers. The shell 105 can receive and direct a medium (such as ram air described herein) through the system 100. The one or more heat exchangers are devices built for efficient heat transfer from one medium to another. Examples of heat exchangers include double pipe, shell and tube, plate, plate and shell, adiabatic wheel, plate fin, pillow plate, and fluid heat exchangers.

The one or more heat exchangers encased by the shell 105 can be referred to as ram heat exchangers. Ram heat exchangers receive ram air, outside air being forced through the shell 105, as a heat sink to cool bleed air (e.g., the first medium F1) and/or fresh air (e.g., the second medium F2). As shown in FIG. 1, the shell 105 comprises a primary heat exchanger 106 and a secondary heat exchanger 107. In a non-limiting embodiment, an exhaust of the cabin discharge air can be released through the shell 105 of the ram circuit and used in conjunction or in place of the ram air.

Also, as shown in FIG. 1, the system can include an outflow heat exchanger 108. In a non-limiting embodiment, an exhaust of the cabin discharge air can be released through the outflow valve (a.k.a. an outflow control valve and a thrust recovery outflow valve). For example, when the cabin discharge air from the outflow heat exchanger 108 is coupled to the outflow valve, the outflow heat exchanger 108 increases the energy in the cabin discharge air, which increases the thrust recovered by the outflow valve.

The system 100 can comprise a compressing device 110. The compressing device 110 can comprise a compressor 112, a turbine 113, a fan 116, and a shaft 118.

The compressing device 110 is a mechanical device that includes components for performing thermodynamic work on the medium (e.g., extracts or works on the first medium F1 and/or the second medium F2 by raising and/or lowering pressure and by raising and/or lowering temperature). Examples of the compressing device 110 include an air cycle machine, a three-wheel air cycle machine, a four-wheel air cycle machine, etc.

The compressor 112 is a mechanical device that raises a pressure of a medium and can be driven by another mechanical device (e.g., a motor or a medium via a turbine. Examples of compressor types include centrifugal, diagonal or mixed-flow, axial-flow, reciprocating, ionic liquid piston, rotary screw, rotary vane, scroll, diaphragm, air bubble, etc. As shown in FIG. 1, the compressor 112 can receive and pressurize the second medium F2 from the inlet 103.

The turbine 113 is mechanical device that extracts work from a medium (also referred to as extracting energy). In the compressing device 110, the turbine drives the compressor 112 and the fan 116 via the shaft 118. The turbine 113 can be a dual entry turbine that includes a plurality of inlet gas flow paths, such as an inner flow path and an outer flow path, to enable mixing of alternative medium flows at the exit of the turbine. The inner flow path can be a first diameter, and the outer flow path can be a second diameter.

The fan 116 (e.g., a ram air fan as shown in FIG. 1) is a mechanical device that can force via push or pull methods air through the shell 105 across the heat exchangers 106 and 107 at a variable cooling to control temperatures.

The system 100 also comprises a water extractor 151, a condenser 162, and a water extractor 164. The water extractor 151 and the water extractor 164 are mechanical devices that perform a process of taking water from a medium. The condenser 162 is particular type of heat exchanger (another example includes a reheater). In a non-limiting embodiment, a condenser and/or a water extractor can combine to be a middle-pressure water separator. A high pressure water separator removes moisture at a highest pressure within an environmental control system (e.g., downstream of the primary heat exchanger 106). A low-pressure water separator removes moisture at a lowest pressure within an environmental control system, such as at a turbine discharge pressure (e.g., mixed air exiting the turbine 113). The middle-pressure water separator removes moisture at a pressure between the lowest pressure and the highest pressure within an environmental control system, such as at a compressor discharge pressure of fresh air exiting a compressor.

The elements of the system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the system 100. Valves can be operated by actuators, such that flow rates of the medium in any portion of the system 100 can be regulated to a desired value. For instance, a vale V1 controls whether a flow of the second medium F2 from the secondary heat exchanger 107 bypasses the condenser 162 in accordance with a mode of the system 100. Note that a combination of components and elements of the system 100 can be referred to as an air conditioning pack or a pack. The pack can exist between the inlet 101, the volume 102, the inlet 103, the outlet 104, and an exhaust of the shell 105.

Operational embodiments of the system 100 of FIG. 1 will now be described with respect to an aircraft. The system 100 can be referred to as an advanced pneumatic system that mixes fresh air with bleed air to produce mixed air according to these operational embodiments. Operational embodiments can be described as operational modes or modes. A first mode, which can be used for ground and/or low altitude flight conditions (such as ground idle, taxi, take-off, and hold conditions), is a low altitude operation of the aircraft. A second mode, which can be used for high altitude flight conditions (such as high altitude cruise, climb, and descent flight conditions), is a high altitude operation of the aircraft.

In the low altitude operation of the aircraft, high-pressure high-temperature bleed air (e.g., the first medium F1) from either then the engine or the auxiliary power unit (e.g., the inlet 101) enters the primary heat exchanger 106. The primary heat exchanger 106 cools the high-pressure high-temperature bleed air to nearly ambient temperature to produce cool high-pressure bleed air. The cool high-pressure bleed air enters the condenser 162, where it is cooled (and dehumidified) to produce cold high-pressure bleed air. Note that the heat sink used by the condenser 162 is the mixed air exhausting from the turbine 113 of the compressing device 110. The cold high-pressure bleed air flows through the water extractor 164, where moisture can be removed to produce cold dry high-pressure bleed air. Note that the combination of the condenser 162 and the water extractor 164 can be considered a high-pressure water extractor because bleed air received by the condenser 162 is at the highest pressure in the system 100. The cold dry high-pressure bleed air enters the turbine 113. The cold dry high-pressure bleed air enters the turbine 113 through a first nozzle, where it is expanded and work extracted.

The work extracted by the turbine 113 drives the compressor 112 used to compress fresh air (e.g., the second medium F2) and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at a middle-pressure (i.e., medium-pressure fresh air). The medium-pressure fresh air enters the outflow heat exchanger 108 and is cooled by cabin discharge air (e.g., the third medium F3) to produce cooled medium-pressure fresh air. The cooled medium-pressure fresh air enters the secondary heat exchanger 107, where it is further cooled to nearly ambient temperature to produce cool medium-pressure fresh air. The cool medium-pressure fresh air then enters the water extractor 151 where any free moisture in the cool medium-pressure fresh air is removed to produce cool dry medium-pressure fresh air. This cool dry medium-pressure fresh air is then directed by the valve V1 to the turbine 113. The cool dry medium-pressure fresh air enters the turbine 113 through a second nozzle, where it is expanded and work extracted.

The two air flows (i.e., the dry ambient fresh air from the water extractor 151 and the cold dry high-pressure bleed air from the water extractor 164) are mixed at the turbine outlet to produce the mixed air. The mixed air leaves the turbine 113 and enters the condenser 162 (to cool the cool high-pressure bleed air leaving the primary heat exchanger 106 in the condenser 162). The mixed air is then sent to condition the volume 102.

In the high altitude operation of the aircraft, the system 100 can operate in a similar way as in the low altitude operation. An exception is that the dry ambient fresh air exiting the water extractor 151 is directed by the valve V1 to a mixing point M1. That is, the fresh air is mixed downstream of the turbine 113 rather than at it. Further, in the second mode, fresh air requirements can be met by mixing the bleed air with fresh air, while an amount of bleed air can reduced by 40% to 60% depending on an altitude. In this way, the environmental control system 100 provides the bleed air reduction ranging from 40% to 60% to provide higher efficiencies with respect to engine fuel burn than contemporary airplane air systems.

Figure 2:
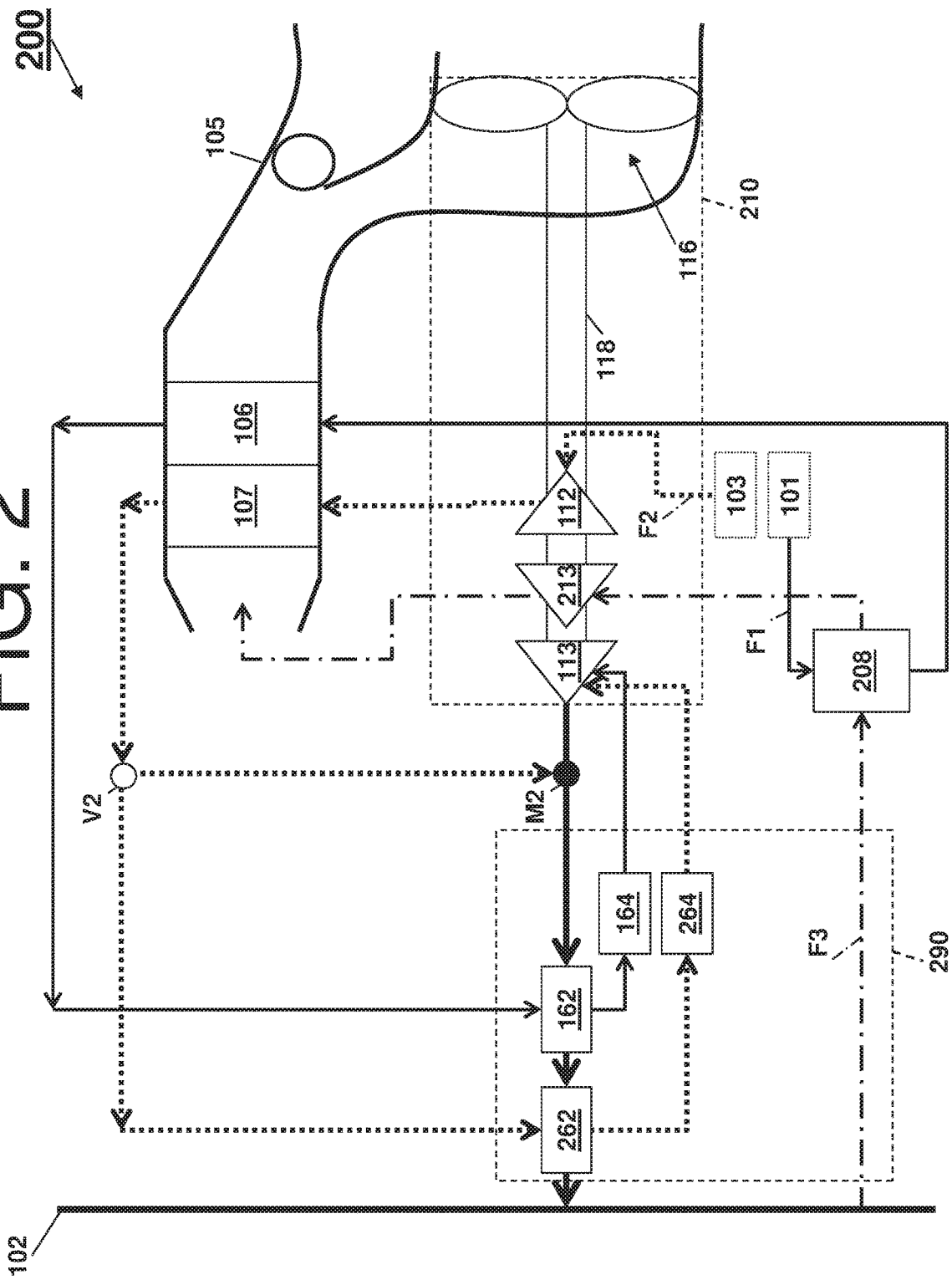
FIG. 2 is a diagram of a schematic of an environmental control system with optimized moisture removal according to an embodiment.
Figure 3:
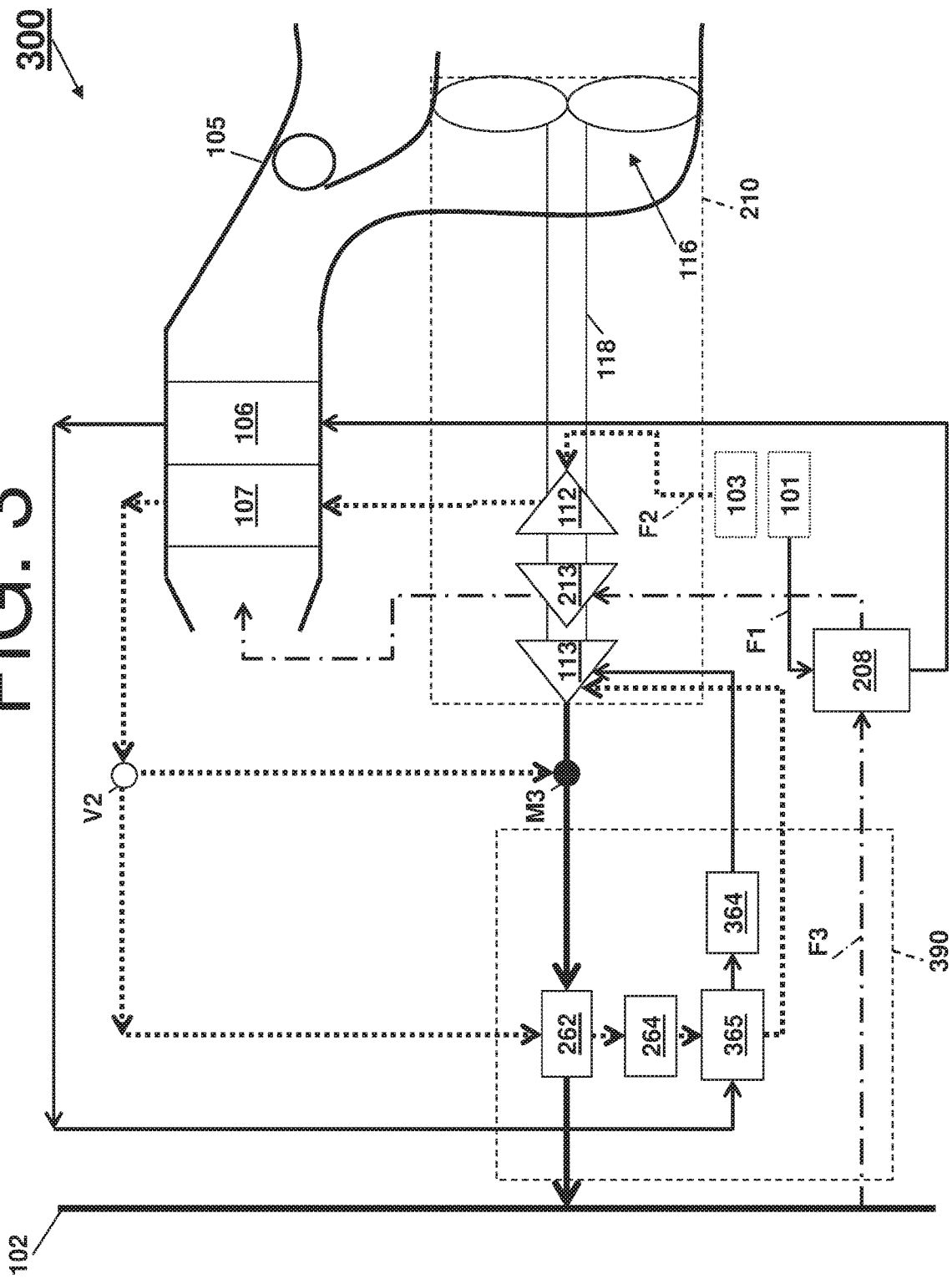
FIG. 3 is a diagram of a schematic of an environmental control system with optimized moisture removal according to another embodiment.

Turning now to FIGS. 2 and 3, variations of the system 100 are shown as systems 200 and 300 according to non-limiting embodiments. In these systems 200 and 300, a removal of moisture in the mixed air going into the pressurized volume is optimized, where FIG. 2 utilizes multiple condensers (e.g., one for the fresh air and one for the bleed air) and FIG. 3 uses a condenser/reheater.

FIG. 2 illustrates a schematic of an environmental control system (e.g., system 200) according to an embodiment, as it could be installed on an aircraft. Components of the system 100 that are similar to the system 200 have been reused for ease of explanation, by using the same identifiers, and are not re-introduced. Alternative components of the environmental control system 200 include a compressing device 210 (that additionally comprises a turbine 213), an outflow heat exchanger 208, a condenser 262, a water extractor 264, a valve V2, and a mixing point M2.

Note that the system 200 can include a moisture removal circuit 290 comprising the condenser 162, the water extractor 164, the condenser 262, and the water extractor 264. The moisture removal circuit 290 is configured to provide the removal of moisture in from fresh and bleed air (and in turn resulting mixed air) destined for the volume 102 based on utilizing the condenser 262 for the fresh air and the condenser 162 for the bleed air (i.e., individual removal of moisture). The condenser 262 and the condenser 162 are shown in series with respect to the mixed air exiting the turbine 113, yet this is not limiting. The condenser 262 and the condenser 162 can also be arranged in parallel and/or in reverse order.

In a first mode (i.e., the low altitude operation of the aircraft), high-pressure high-temperature bleed air (e.g., the first medium F1) from either then the engine or the auxiliary power unit (e.g., the inlet 101) enters the outflow heat exchanger 208. The high-pressure high-temperature bleed air is cooled by cabin discharge air (e.g., the third medium F3) to produce cold high-pressure bleed air.

Note that the cabin discharge air can be supplied to the shell 105 of the ram circuit of the system 200 via the turbine 213. The turbine 213 extracts work from the cabin discharge air, which is heated (energized) as it flows through the outflow heat exchanger 208 to produce heated discharge air. The work extracted by the turbine 213 can drive the compressor 112, which can be used to compress fresh air (e.g., the second medium F2) and drive the fan 116 used to move ram air through the ram air heat exchangers (e.g., the primary heat exchanger 106 and the secondary heat exchanger 107). The act of extracting work from the heated discharge air cools it to produce cool discharge air. The cool discharge air can be supplied to the shell 105 of the ram circuit to act as a heat sink for the secondary heat exchanger 107 and the primary heat exchanger 106.

The cold high-pressure bleed air then enters the primary heat exchanger 106. The primary heat exchanger 106 further cools the cold high-pressure bleed air to nearly ambient temperature to produce ambient high-pressure bleed air. The ambient high-pressure bleed air enters the condenser 162, where it is cooled to produce high-pressure low-temperature bleed air. Note that the heat sink used by the condenser 162 is the mixed air exhausting from the turbine 113 of the compressing device 110. The high-pressure low-temperature bleed air flows through the water extractor 164, where moisture can be removed to produce dry high-pressure bleed air. The dry high-pressure bleed air enters the turbine 113. Note that the combination of the condenser 162 and the water extractor 164 can be considered a high-pressure water extractor because bleed air received by the condenser 162 is at the highest pressure in the system 200. The dry high-pressure bleed air enters the turbine 113 through a first nozzle, where it is expanded and work extracted The work extracted by the turbine 113 drives the compressor 112 used to compress the fresh air (e.g., the second medium F2) and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at a middle-pressure (i.e., medium-pressure fresh air). The medium-pressure fresh air enters the secondary heat exchanger 107, where it is cooled to nearly ambient temperature to produce cool medium-pressure fresh air.

The cool medium-pressure fresh air is then directed by the valve V2 to the condenser 262. The cool medium-pressure fresh air then enters the condenser 262, where it is cooled (and dehumidified) to produce cold medium-pressure fresh air. Note that the heat sink used by the condenser 262 is the mixed air exhausting from the condenser 162. The cold medium-pressure fresh air then flows through the water extractor 264, where any free moisture in the cold medium-pressure fresh air is removed to produce cold dry medium-pressure fresh air. Note that the combination of the condenser 262 and the water extractor 264 can be considered a middle-pressure water extractor because fresh air received by the condenser 262 is at the pressure between the lowest pressure and the highest pressure within the system 200. This cold dry medium-pressure fresh air enters the turbine 113 through a second nozzle, where it is expanded and work extracted.

The two air flows (i.e., the cold dry ambient fresh air from the water extractor 264 and the dry high-pressure bleed air from the water extractor 164) are mixed at the turbine outlet to produce the mixed air. The mixed air leaves the turbine 113 and enters the condenser 162 (to cool the cool high-pressure bleed air leaving the primary heat exchanger 106 in the condenser 162). The mixed air leaves the condenser 162 and enters the condenser 262 (to cool the ambient fresh air leaving the secondary heat exchanger 107 in the condenser 262). The mixed air leaving the condenser 262 is then sent to condition the volume 102.

In a second mode (i.e., the high altitude operation of the aircraft), the system 200 can operate in a similar way as in the low altitude operation. An exception is that the ambient fresh air leaving the secondary heat exchanger 107 is directed by the valve V2 to a mixing point M2. That is, the fresh air is mixed downstream of the turbine 113 rather than at it. Further, in the second mode, fresh air requirements can be met by mixing the bleed air with fresh air, while an amount of bleed air can reduced by 40% to 60% depending on an altitude. In this way, the environmental control system 200 provides the bleed air reduction ranging from 40% to 60% to provide higher efficiencies with respect to engine fuel burn than contemporary airplane air systems.

FIG. 3 illustrates a schematic of an environmental control system (e.g., system 300) according to an embodiment, as it could be installed on an aircraft. Components of the systems 100 and 200 that are similar to the system 300 have been reused for ease of explanation, by using the same identifiers, and are not re-introduced. Alternative components of the environmental control system 300 include a water extractor 364, a condenser/reheater 365, and a mixing point M3.

Note that the system 300 can include a moisture removal circuit 390 comprising the condenser 262, the water extractor 264, the water extractor 364, and the condenser/reheater 365. The moisture removal circuit 390 is configured to provide the removal of moisture in from fresh and bleed air (and in turn resulting mixed air) destined for the volume 102. The condenser 262, the water extractor 264, the water extractor 364, and the condenser/reheater 365 are shown in FIG. 3 as warming cold fresh air by further cooling the bleed air, yet this is not limiting. The condenser 262, the water extractor 264, the water extractor 364, and the condenser/reheater 365 can also be arranged within the system 300 to warm cold bleed air by further cooling the fresh air.

Generally, in a first mode, the system 300 can use the turbine 113 to extract energy from both the bleed air and fresh air, which in the process makes the cold mixed air. This cold mixed air can be used by the system 300 to cool fresh air in the condenser 262. The fresh air then leaves the condenser 262 and enters the reheater 365. In the reheater 365, the fresh air is heated and the bleed air is cooled. In the first mode (i.e., the low altitude operation of the aircraft), high-pressure high-temperature bleed air (e.g., the first medium F1) from either then the engine or the auxiliary power unit (e.g., the inlet 101) enters the outflow heat exchanger 208. The high-pressure high-temperature bleed air is cooled by cabin discharge air (e.g., the third medium F3) to produce cold high-pressure bleed air.

Note that the cabin discharge air can be supplied to the shell 105 of the ram circuit of the system 200 via the turbine 213. The turbine 213 extracts work from the cabin discharge air, which is heated (energized) as it flows through the outflow heat exchanger 208 to produce heated discharge air. The work extracted by the turbine 213 can drive the compressor 112, which can be used to compress fresh air (e.g., the second medium F2) and drive the fan 116 used to move ram air through the ram air heat exchangers (e.g., the primary heat exchanger 106 and the secondary heat exchanger 107). The act of extracting work from the heated discharge air cools it to produce cool discharge air. The cool discharge air can be supplied to the shell 105 of the ram circuit to act as a heat sink for the secondary heat exchanger 107 and the primary heat exchanger 106.

The cold high-pressure bleed air then enters the primary heat exchanger 106. The primary heat exchanger 106 further cools the cold high-pressure bleed air to nearly ambient temperature to produce ambient high-pressure bleed air. The ambient high-pressure bleed air enters the condenser/reheater 365, where it is cooled to produce high-pressure low-temperature bleed air. In an embodiment, the condenser/reheater 365 cools the bleed air, while condensing moisture from the bleed air. Note that the heat sink used by the condenser/reheater 365 is cold dry medium-pressure fresh air exhausting from the water extractor 264. The high-pressure low-temperature bleed air flows through the water extractor 364, where moisture can be removed to produce dry high-pressure bleed air. Note that the combination of the condenser/reheater 365 and the water extractor 364 can be considered a high-pressure water extractor because bleed air received by the condenser/reheater 365 is at the highest pressure in the system 300. The dry high-pressure bleed air enters the turbine 113. The dry high-pressure bleed air enters the turbine 113 through a first nozzle, where it is expanded and work extracted.

The work extracted by the turbine 113 drives the compressor 112 used to compress the fresh air (e.g., the second medium F2) and drives the fan 116 used to move ram air through the ram air heat exchangers (e.g., the primary heat exchanger 106 and the secondary heat exchanger 107). The act of compressing the fresh air heats (and compresses) it to produce compressed fresh air, which is at a middle-pressure (i.e., medium-pressure fresh air). The medium-pressure fresh air enters the secondary heat exchanger 107, where it is cooled to nearly ambient temperature to produce ambient medium-pressure fresh air.

The ambient medium-pressure fresh air is then directed by the valve V2 to the condenser 262. The ambient medium-pressure fresh air then enters the condenser 262, where it is cooled (and dehumidified) to produce cold medium-pressure fresh air. Note that the heat sink used by the condenser 262 is the mixed air exhausting from the turbine 113. The cold medium-pressure fresh air then flows through the water extractor 264, where any free moisture in the cold ambient fresh air is removed to produce the cold dry medium-pressure fresh air. The dry medium-pressure fresh air then enters the condenser/reheater 365. The condenser/reheater 365 heats (i.e., reheats with respect to the condenser 262) the cold dry medium-pressure fresh air to produce warm dry medium-pressure fresh air. Note that the cold dry medium-pressure fresh air is the heat sink used by the condenser/reheater 365 to cool the ambient high-pressure bleed air exhausting from the primary heat exchanger 106. The warm dry medium-pressure fresh air enters the turbine 113 through a second nozzle, where it is expanded and work extracted.

The two air flows (i.e., the warm dry medium-pressure fresh air from the condenser/reheater 365 and the dry high-pressure bleed air from the water extractor 364) are mixed at the turbine outlet to produce the mixed air. The mixed air leaves the turbine 113 and enters the condenser 162 (to cool the cool high-pressure air leaving the primary heat exchanger 106 in the condenser 162). The mixed air leaves the condenser 162 and enters the condenser 262 (to cool the ambient fresh air leaving the secondary heat exchanger 107 in the condenser 262). The mixed air leaving the condenser 262 is then sent to condition the volume 102. Note that the condenser/reheater 365 at least provides the technical effects and benefits of condensing moisture in the bleed air, reducing a moisture heat load in the mixed air by at least 25%, and adding energy to the system 300 by increasing compressor power of the compressor 112 by at least 5%.

In a second mode (i.e., the high altitude operation of the aircraft), the system 300 can operate in a similar way as in the low altitude operation. An exception is that the ambient fresh air leaving the secondary heat exchanger 107 is directed by the valve V2 to a mixing point M3. That is, the fresh air is mixed downstream of the turbine 113 rather than at it. Further, in the second mode, fresh air requirements can be met by mixing the bleed air with fresh air, while an amount of bleed air can reduced by 40% to 60% depending on an altitude. In this way, the environmental control system 300 provides the bleed air reduction ranging from 40% to 60% to provide higher efficiencies with respect to engine fuel burn than contemporary airplane air systems.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The flow diagrams depicted herein are just one example. There may be many variations to this diagram or the steps (or operations) described therein without departing from the spirit of embodiments herein. For instance, the steps may be performed in a differing order or steps may be added, deleted or modified. All of these variations are considered a part of the claims.

While the preferred embodiment has been described, it will be understood that those skilled in the art, both now and in the future, may make various improvements and enhancements which fall within the scope of the claims which follow. These claims should be construed to maintain the proper protection.

What is claimed is:

1. An environmental control system coupled to an engine configured to provide a first medium, the environmental control system being coupled to an inlet configured to provide a second medium, the environmental control system comprising:
   a ram air circuit including a ram air shell through which a flow of ram air passes;
   a compressing device comprising a compressor and a turbine, the turbine receiving the first medium and the second medium, and the turbine exhausting mixed air, wherein a pressure of the first medium provided to the turbine is greater than a pressure of the second medium provided to the turbine; and
   a moisture removal circuit comprising a high-pressure water separator associated with the first medium and a second water separator associated with the second medium, the high-pressure water separator including a first water extractor and a first condenser, and the second water separator including a second water extractor and a heat exchanger, the heat exchanger being arranged within the ram air shell such that the flow of ram air is configured to remove heat from the second medium within the heat exchanger;
   wherein the first and second water extractors separately remove moisture from each of the first and second mediums, respectively, prior to the turbine receiving the first medium and the second medium;
   an outflow heat exchanger arranged downstream from the compressor and upstream from the heat exchanger of the second water separator relative to a flow of the second medium such that the outflow heat exchanger is not arranged within the ram air circuit, the second medium being cooled within the outflow heat exchanger by a third medium distinct from the first medium, the second medium, and the flow of ram air;
   a first mixing point that is downstream of the turbine when the environmental control system is operating in a first mode; and
   a second mixing point that is at the turbine when the environmental control system is operating in a second mode, wherein the second medium is provided to the second water separator when the environmental control system is operating in both the first mode and the second mode.

2. The environmental control system of claim 1, wherein the first medium is bleed air, and
   wherein the second medium is fresh air,
   wherein the compressing device comprises an air cycle machine including the compressor and the turbine.

* * * * *